(No Model.) 2 Sheets—Sheet 1.

R. SHELDON.
COPY HOLDER.

No. 519,048. Patented May 1, 1894.

WITNESSES:
John A. Rennie
C. Sedgwick

INVENTOR
R. Sheldon
BY Munn & Co
ATTORNEYS.

THE NATIONAL LITHOGRAPHING COMPANY,
WASHINGTON, D. C.

(No Model.) 2 Sheets—Sheet 2.
R. SHELDON.
COPY HOLDER.

No. 519,048. Patented May 1, 1894.

WITNESSES:
John A. Rennie
C. Sedgwick

INVENTOR
R. Sheldon
BY
Munn & Co.
ATTORNEYS.

UNITED STATES PATENT OFFICE.

ROSECRANS SHELDON, OF CHICAGO, ILLINOIS.

COPY-HOLDER.

SPECIFICATION forming part of Letters Patent No. 519,048, dated May 1, 1894.

Application filed March 28, 1893. Serial No. 467,977. (No model.)

*To all whom it may concern:*

Be it known that I, ROSECRANS SHELDON, of Chicago, in the county of Cook and State of Illinois, have invented a new and Improved Copy-Holder, of which the following is a full, clear, and exact description.

My invention relates to improvements in that class of devices which are used for holding matter to be copied, and the object of my invention is to produce a copy-holder on which a book, manuscript or similar thing may be quickly and easily fastened, and to provide an aligning arm which is adapted to move over the lines to be copied so as to indicate the proper line; and further to provide a simple means for moving the line arm line by line by simply touching the handle.

Another object of my invention is to produce a copy-holder of simple construction which may be easily adjusted so as to hold copy at any necessary angle.

To these ends, my invention consists in certain features of construction and combinations of parts, which will be hereinafter described and pointed out in the claims.

Reference is to be had to the accompanying drawings, forming a part of this specification, in which similar figures of reference indicate corresponding parts in all the views.

Figure 2:
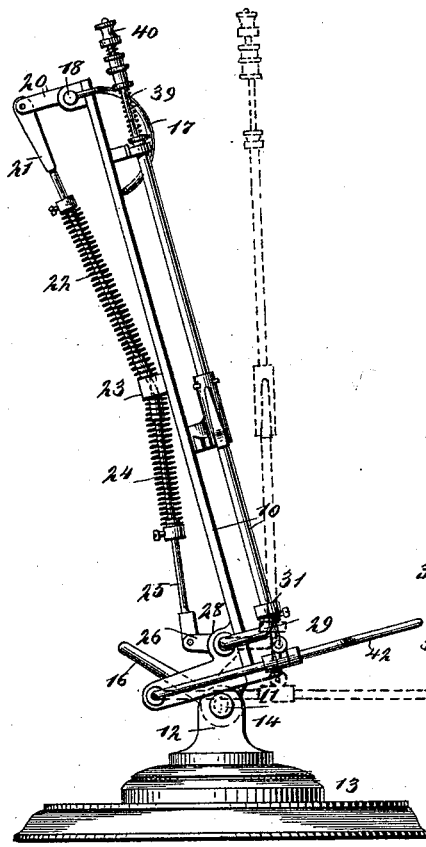
Figure 1:
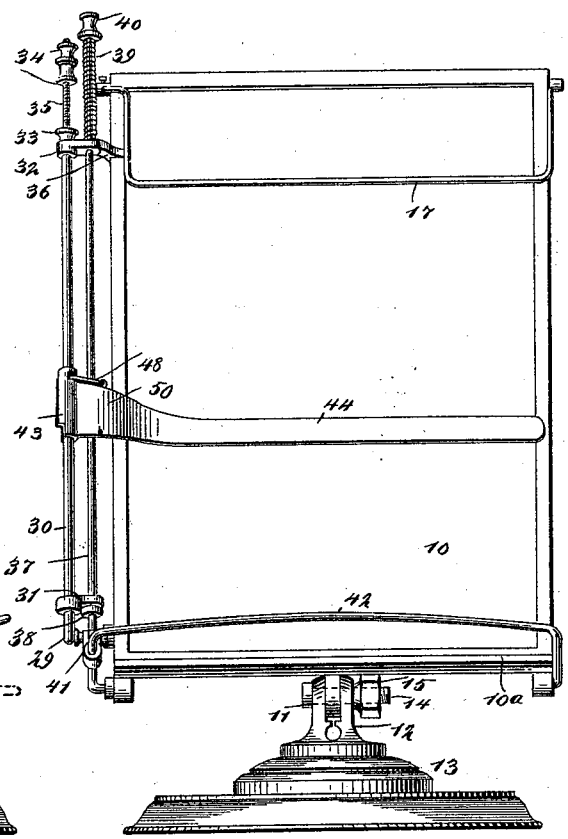
Figure 3:
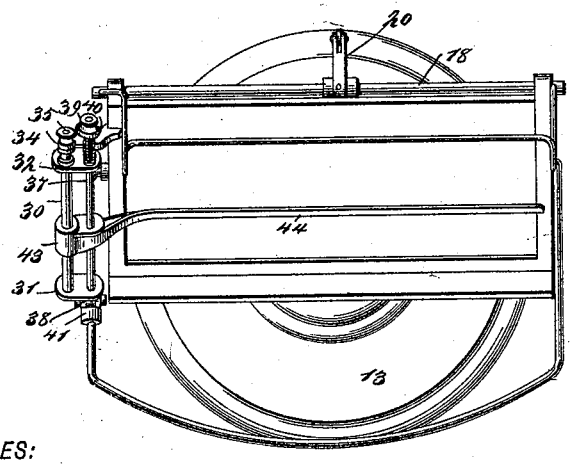
Figure 4:
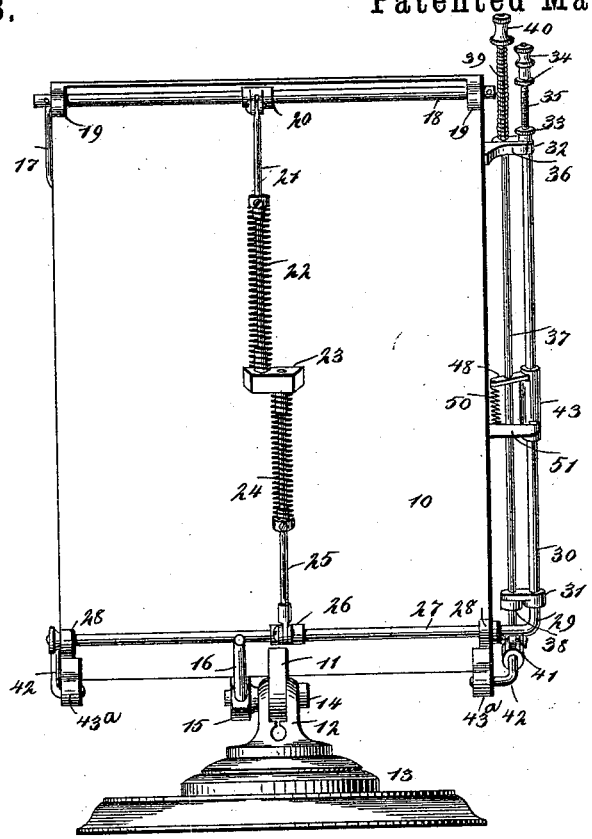
Figure 5:
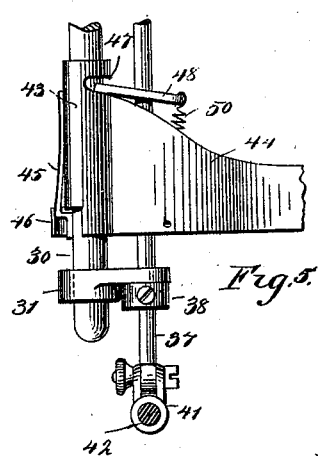
Figure 6:
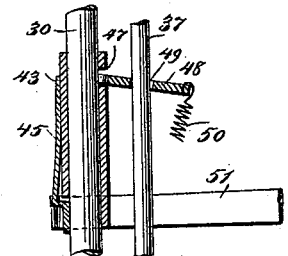
Figure 8:
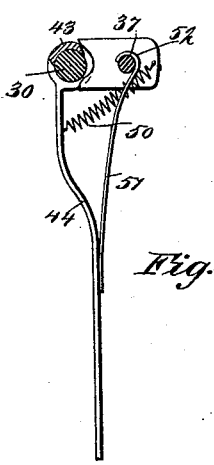
Figure 7:
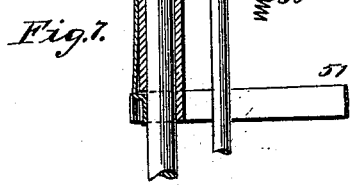

Figure 1 is a front elevation of the copy-holder. Fig. 2 is a side elevation of the same. Fig. 3 is a plan view. Fig. 4 is a rear elevation. Fig. 5 is a detail front elevation of the brake and clutch mechanism for holding the line arm in a fixed position. Fig. 6 is a detail vertical section of the brake and clutch mechanism. Fig. 7 is a section similar to that shown in Fig. 6, with the clutch arm in position to permit the line arm to be raised; and Fig. 8 is an inverted sectional plan of the brake and clutch mechanism.

The copy-holder is provided with the usual board or plate 10, which is adapted to be held at an inclination, and has the usual base flange 10ª on which the material upon the board rests. The board has at its lower edge and back side a rearwardly and downwardly-extending arm 11, which is journaled between lugs 12 on the top of the pedestal or base 13, being carried on a bolt 14, which is provided with a nut 15 having a laterally-extending handle 16, and by tightening the nut, the arm 11 may be fastened between the lugs 12 so as to hold the plate or board 10 in a fixed position, the lugs 12 being sufficiently springy to permit them to be clamped firmly to the arm.

On the front side of the copy-board near the top, is a bail 17, which is adapted to hold in place the upper portion of the material on the board, and this bail has its arms extending rearwardly opposite the side edges of the board 10, and the said arms are secured to a shaft 18, which extends across the back of the board, near the top, and is journaled in lugs 19, as best shown in Fig. 4. On the shaft 18 is a rearwardly-extending crank arm 20, to which is pivotally connected a depending rod 21, and this at its lower end is secured to a spring 22, which is also attached to a lug 23, on the center and back of the board 10. The spring 22 normally presses the rod 21 and arm 20 upward, thus forcing the bail 17 against the face of the board so that it will hold securely any material which is placed between itself and the board.

Extending downward from the lug 23, is a spring 24 similar to the spring 22, and the spring 24 presses downward on a rod 25 and crank arm 26, which projects rearward from a shaft 27 arranged at the bottom of the plate or board 10, and journaled in lugs 28 on the back of the board. The shaft 27 projects beyond one edge of the board, and is bent outward and forward, as shown at 29, and terminates in a vertical rod 30, which extends parallel with one edge of the board or plate 10 when in its normal position. The rod 30 is provided with inwardly-extending guide plates 31 and 32, which are arranged near its lower and upper ends, and the upper guide plate is held against a shoulder on the top of the rod by a nut 33. The upper end of the rod is also provided with nuts 34, which fit on the threaded upper end 35 of the rod, and the upper of these nuts is adapted to contact with a nut on the movable rod 37, to be hereinafter described, and limit the downward movement of the rod. The rod 30 is swung by the pressure of the spring 24, so as to lie normally parallel with the edge of the board 10, and with the guide plate 32 against an arm 36 on the said board. The vertically-movable rod 37 is held to slide through the guide plates 31 and 32, this rod or arm being normally pressed upward, but having its upward movement limited by a collar 38, which strikes the under side of the guide plate 31. On the rod 37 above the guide plate 32, is a spring 39, which abuts with a nut 40 on the top of the rod, and which normally raises the rod. The nut 40 is adapted, when the rod 37 is pulled down, to strike the top of the upper nut 34, thus limiting the downward movement of the rod 37, and the nuts 40 and 34 may be adjusted so as to make this movement correspond with the distance between the lines to be copied. The lower end of the rod 37 is pivoted to a coupling 41 adapted to slide on the bail-shaped handle 42, which is adapted to swing vertically, and projects in front of the board 10, at the lower end of the board, the arms of the handle extending rearward behind the side edges of the board, where they are pivoted in lugs 43ª, shown in Fig. 4. It will be seen then that every time the handle 42 is depressed, it will carry with it the rod 37, and when the pressure is removed from the handle the spring 39 will lift the rod and handle. If, however, the handle is depressed to a great extent, the downward pressure which is applied after the nut 40 strikes the nut 34, causes the shafts 30 and 37 to swing outward away from the board, as indicated by dotted lines in Fig. 2 and these rods may also be swung outward if necessary, by grasping them at the top and pulling outward upon them. A sleeve 43 is held to slide on the rod 30, and extending horizontally from this sleeve is the line arm 44, which extends across the face of the board 10, and is adapted to indicate the line to be copied. The sleeve 43 is provided with a spring brake 45, which is secured to one side of the sleeve, and the thickened free end 46 of which presses against the rod 30 with sufficient friction to hold the sleeve in place on the rod. The sleeve 43 is slotted transversely near the top, as shown at 47, and in this slot is held the free end of a clutch plate 48, which has a central perforation 49 to slide on the rod 37, and the outer end of this clutch plate is normally pressed downward by a spring 50, one end of which is secured to the plate and the other to the arm 44. On the inner side of the arm 44, near the pivoted end of the arm, is fastened a flat spring 51, which has its free end formed into a hook 52, see Fig. 8, and this hook is adapted to engage the rod 37 when the arm 44 is swung outward so as to limit the outward movement of the arm.

The operation of the device is as follows: The manuscript to be copied is fastened upon the board 10 beneath the bail 17, which is sprung out to permit the manuscript to be placed beneath it, the arm 44 being also swung outward, as shown in Fig. 5, to permit the manuscript to be placed in position. After the manuscript is in position, the arm 44 is swung back over the face of the manuscript and is raised to come just beneath the first line of the manuscript. The nuts 34 and 40 are adjusted so that the rod 37 may have a movement corresponding with the distance between the lines on the manuscript, and after the first line is copied, the operator strikes the handle 42 which carries the rod 37 downward until the nut 40 strikes the top nut 34, and the arm 44 will then be beneath the second line of the manuscript, the brake 45 holding the sleeve 43 in place, and the clutch arm 48 by its inclined position gripping the two rods 30 and 37, so as to prevent any possible raising by accident of the sleeve and line arm 44. But this arrangement while preventing the sleeve and line arm from being raised, permits the rod 37 to slide upward through the clutch plate after every depression of the handle 42. The above operation is repeated until all the lines are copied. When the line arm is to be again raised at the top of the page, the clutch plate 48 is lifted into a horizontal position, as shown in Fig. 7, and it may then be easily raised.

Having thus described my invention, I claim as new and desire to secure by Letters Patent—

1. The combination with the copy board, the guide rod ranging lengthwise of the board at one side, a line arm pivoted to and held to slide on the guide rod, a second rod parallel with the guide rod and having connection with the line arm for actuating the latter, and a catch on the line arm limiting the outward movement of the line arm, said catch normally being free from engagement with the rods but having movement with the line arm to engage the second or operating rod when the line arm is swung on its pivotal connection, substantially as described.

2. A copy-holder, comprising the usual flat copy board, a support for the same which permits the inclination of the board to be adjusted, a spring-pressed bail arranged on the face of the board, a guide rod arranged at one side of the board and connected at its lower end with a rock shaft the upper end of the guide rod being free, a vertically-movable rod held to slide parallel with the guide rod, a line arm carried by the guide rod and extending across the face of the board, and means for moving the line arm line by line by the movement of the vertically movable rod, substantially as specified.

3. A copy-holder, comprising a copy board having means for holding material thereon, an outwardly-swinging guide rod extending normally parallel with the edge of the board, a vertically-movable rod held to slide in guide plates on the guide rod, a handle for depressing the vertically-movable rod, means for limiting the movement of said rod, a line arm carried by the guide rod and extending across the face of the copy board, and a clutch connected between the arm and the vertically-movable rod whereby the movement of the said rod will move the line arm, substantially as specified.

4. The combination, with the copy board having a suitable support, of the bail extending across the front of the board, a rock shaft journaled on the back of the board and secured to the bail, an outwardly-extending crank arm on the rock shaft, a spring arranged to press the crank arm and hold the bail against the face of the board, and a guide rod pivotally connected with the crank arm and passing through said spring substantially as specified.

5. The combination, with the copy-board and the outwardly-swinging guide rod arranged at one side of the board, of a spring pressed handle extending in front of the board, a vertically movable rod carried by the handle and held to slide through guide plates on the guide rod, a sleeve held to slide on the guide rod, a line arm secured to the sleeve and extending across the face of the board, and a spring-pressed clutch plate held in a slot in the sleeve and arranged to run on the vertically-movable rod, substantially as specified.

6. The combination of the copy board, the guide rod arranged at one side of the board and provided with a vertically-movable nut or abutment near its upper end, a vertically-movable and spring pressed rod arranged parallel with the guide rod and provided with an abutment to strike the abutment of the guide rod, a line arm carried by the guide rod and extending across the face of the copy board, and means for moving downward the line arm by the downward movement of the vertically movable rod, substantially as specified.

7. The combination, with the copy board, of a rock shaft, a guide arm carried by said rock shaft and extending upward substantially parallel with the copy board, the upper end of the guide rod being free, a line arm carried by such guide rod, an operating rod for the line arm, arranged parallel or approximately so, with the guide rod, means for actuating said operating rod to progressively move the line arm, the said operating rod in its abnormal or excessive movements, contacting with the guide rod, and serving to swing the same outward substantially as described.

8. The combination with the copy board of a rod parallel or approximately so with the copy board, and mounted at its lower end to swing away from the board, a line arm sliding on said rod, a second rod parallel or approximately so with the first mentioned rod, and movable into contact with the latter for swinging the same outward and means for actuating such second rod, substantially as described.

9. The combination with the copy board of a rod parallel or approximately so with the copy board, and mounted at its lower end to swing away from the board, a line arm sliding on said rod, a second rod parallel or approximately so with the first mentioned rod, and movable into contact with the latter for swinging the same outward, an adjustable contact on one of said rods for engaging the other, and means for actuating said second rod, substantially as described.

ROSECRANS SHELDON.

Witnesses:
AARON G. DICUS,
AUGUST J. SICKINGER.